US010552324B2

United States Patent
Ash et al.

(10) Patent No.: US 10,552,324 B2
(45) Date of Patent: *Feb. 4, 2020

(54) POPULATING A SECOND CACHE WITH TRACKS FROM A FIRST CACHE WHEN TRANSFERRING MANAGEMENT OF THE TRACKS FROM A FIRST NODE TO A SECOND NODE

(71) Applicant: INTERNATIONAL BUSINESS MACHINE CORPORATION, Armonk, NY (US)

(72) Inventors: Kevin J. Ash, Tucson, AZ (US); Matthew G. Borlick, Tucson, AZ (US); Lokesh M. Gupta, Tucson, AZ (US); Matthew J. Kalos, Tucson, AZ (US); Brian A. Rinaldi, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/125,641

(22) Filed: Sep. 7, 2018

(65) Prior Publication Data

US 2019/0004951 A1 Jan. 3, 2019

Related U.S. Application Data

(63) Continuation of application No. 14/918,408, filed on Oct. 20, 2015.

(51) Int. Cl.
*G06F 12/00* (2006.01)
*G06F 12/0815* (2016.01)
(Continued)

(52) U.S. Cl.
CPC ............ *G06F 12/0815* (2013.01); *G06F 3/06* (2013.01); *G06F 12/0868* (2013.01);
(Continued)

(58) Field of Classification Search
CPC ..... G06F 3/06; G06F 12/0868; G06F 12/0815
See application file for complete search history.

(56) References Cited

U.S. PATENT DOCUMENTS 7,035,979 B2  4/2006 Azevedo et al.
8,006,061 B1  8/2011 Chatterjee et al.
(Continued)

FOREIGN PATENT DOCUMENTS

CN  103744800  4/2014

OTHER PUBLICATIONS

U.S. Appl. No. 14/918,424, filed Oct. 20, 2015, by inventors K.J. Ash, M.G. Borlick, L.M. Gupta, M.J. Kalos, and B. A. Rinaldi.
(Continued)

*Primary Examiner* — Baboucarr Faal
(74) *Attorney, Agent, or Firm* — David W. Victor; Konrad, Raynes, Davda and Victor LLP

(57) ABSTRACT

Provided are a computer program product, system, and method for populating a second cache with tracks from a first cache when transferring management of the tracks from a first node to a second node. Management of a first group of tracks in the storage managed by the first node is transferred to the second node managing access to a second group of tracks in the storage. After the transferring the management of the tracks, the second node manages access to the first and second groups of tracks and caches accessed tracks from the first and second groups in the second cache of the second node. The second cache of the second node is populated with the tracks in a first cache of the first node.

21 Claims, 7 Drawing Sheets

(51) Int. Cl.
*G06F 12/0868* (2016.01)
*G06F 12/0873* (2016.01)
*G06F 12/123* (2016.01)
*G06F 3/06* (2006.01)

(52) U.S. Cl.
CPC ........ *G06F 12/0873* (2013.01); *G06F 12/123* (2013.01); *G06F 2212/1032* (2013.01); *G06F 2212/285* (2013.01); *G06F 2212/462* (2013.01); *G06F 2212/608* (2013.01)

(56) References Cited

U.S. PATENT DOCUMENTS

| | | | |
|---|---|---|---|
| 8,812,899 | B1 | 8/2014 | Fultz et al. |
| 8,935,479 | B2 | 1/2015 | Benhase et al. |
| 9,430,386 | B2 | 8/2016 | Bruce et al. |
| 9,454,317 | B2 | 9/2016 | Ishizaki |
| 10,320,936 | B2 | 6/2019 | Ash et al. |
| 2009/0222624 | A1 | 9/2009 | Giacomini et al. |
| 2011/0131373 | A1 | 6/2011 | Kumar et al. |
| 2011/0197096 | A1 | 8/2011 | Nakamura et al. |
| 2013/0132674 | A1 | 5/2013 | Sundrani |
| 2013/0185497 | A1 | 7/2013 | Benhase et al. |
| 2013/0185501 | A1 | 7/2013 | Ash et al. |
| 2014/0143452 | A1 | 5/2014 | Kivity |
| 2015/0074222 | A1 | 3/2015 | Liang et al. |
| 2016/0203080 | A1 | 7/2016 | Bert et al. |
| 2017/0109284 | A1 | 4/2017 | Ash et al. |
| 2017/0111468 | A1 | 4/2017 | Ash et al. |
| 2019/0004951 | A1 | 1/2019 | Ash et al. |
| 2019/0222669 | A1 | 7/2019 | Ash et al. |

OTHER PUBLICATIONS

List of Patents or Patent Applications Treated as Related, dated Sep. 7, 2018, pp. 2.
English translation of CN103744800 dated Apr. 23, 2014. pp. 25.
"HyperSwap Helps Keeps Storage from Becoming a Single Point of Failure", AIX, eNewsletter, Aug. 2013, [online] [retrieved Oct. 9, 2015] http://www.ibmsystemsmag.com/aix/administrator/highavailability/hyper . . . .
W. Bauer, et al., "IBM DS8000 and z/OS Basic HyperSwap", IBM Corp., RedPaper, 2008, pp. 38.
U.S. Appl. No. 14/918,408, filed Oct. 20, 2015.
Office Action dated Dec. 16, 2016, pp. 20, for U.S. Appl. No. 14/918,408, filed Oct. 20, 2015.
Response dated Mar. 16, 2017, pp. 14, to Office Action dated Dec. 16, 2016, pp. 20, for U.S. Appl. No. 14/918,408, filed Oct. 20, 2015.
Final Office Action dated Jun. 22, 2017, pp. 12, for U.S. Appl. No. 14/918,408, filed Oct. 20, 2015.
Response dated Sep. 11, 2017, pp. 14, to Office Action dated Dec. 16, 2016, pp. 20, for U.S. Appl. No. 14/918,408, filed Oct. 20, 2015.
Office Action dated Nov. 16, 2017, pp. 13, for U.S. Appl. No. 14/918,408, filed Oct. 20, 2015.
Response dated Feb. 16, 2018, pp. 14, to Office Action dated Nov. 16, 2017, pp. 13, for U.S. Appl. No. 14/918,408, filed Oct. 20, 2015.
Notice of Allowance dated Jun. 14, 2018 pp. 13, for U.S. Appl. No. 14/918,408, filed Oct. 20, 2015.
Office Action dated Dec. 15, 2017, pp. 32, for U.S. Appl. No. 14/918,424, filed Oct. 20, 2015.
Response dated Mar. 15, 2018, pp. 14, to Office Action dated Dec. 15, 2017, pp. 32, for U.S. Appl. No. 14/918,424, filed Oct. 20, 2015.
Final Office Action dated Apr. 18, 2018, pp. 21, for U.S. Appl. No. 14/918,424, filed Oct. 20, 2015.
Response dated Mar. 15, 2018, pp. 14, to Final Office Action dated Apr. 18, 2018, pp. 21, for U.S. Appl. No. 14/918,424, filed Oct. 20, 2015.
Office Action dated Aug. 8, 2018, pp. 26, for U.S. Appl. No. 14/918,424.
Response dated Nov. 8, 2018, pp. 16, to Office Action dated Aug. 8, 2018, pp. 26, for U.S. Appl. No. 14/918,424.
Notice of Allowance dated Jan. 25, 2019, pp. 8, for U.S. Appl. No. 14/918,424.
US Patent Application, dated Jul. 24, 2019, for U.S. Appl. No. 16/521,587 (18.603C2), filed Jul. 24, 2019, Total 31 pages.
Preliminary Amendment, dated Jul. 24, 2019, for U.S. Appl. No. 16/521,587 (18.603C2), filed Jul. 24, 2019, Total 8 pages.
US Patent Application, dated Mar. 25, 2019, for U.S. Appl. No. 16/364,102 (18.614C1), filed Mar. 25, 2019, Total 30 pages.
Preliminary Amendment dated Mar. 25, 2019, for U.S. Appl. No. 16/364,102 (18.614C1), filed Mar. 25, 2019, Total 8 pages.
List of Patents or Patent Applications Treated As Related, dated Aug. 26, 2019, Total 2 pages.
Office Action, dated Aug. 27, 2019, for U.S. Appl. No. 16/364,102 filed Mar. 25, 2019, Total 26 pages.
Response to Office Action, dated Nov. 21, 2019, for U.S. Appl. No. 16/364,102, filed Mar. 25, 2019, Total 10 pages.
Notice of Allowance, dated Dec. 4, 2019, for U.S. Appl. No. 16/364,102, filed Mar. 25, 2019, Total 23 pages.

POPULATING A SECOND CACHE WITH TRACKS FROM A FIRST CACHE WHEN TRANSFERRING MANAGEMENT OF THE TRACKS FROM A FIRST NODE TO A SECOND NODE

BACKGROUND OF THE INVENTION

1. Field of the Invention

The present invention relates to a computer program product, system, and method for populating a second cache with tracks from a first cache when transferring management of the tracks from a first node to a second node.

2. Description of the Related Art

In a storage controller managing access to storage volumes having multiple redundant nodes, during normal operation when both nodes are available, the nodes may split the management of volumes and tracks in the storage. When one node is taken offline as a result of a failure or to perform a code load update, the surviving node may take over management of the volumes assigned to the node taken offline to allow continual availability of access to all the volumes in the storage.

There is a need in the art for improved techniques for transferring ownership of tracks and volumes from one node to another when such operations typically occur, such as during a code load update.

SUMMARY

Provided are a computer program product, system, and method for populating a second cache with tracks from a first cache when transferring management of the tracks from a first node to a second node. Management of a first group of tracks in the storage managed by the first node is transferred to the second node managing access to a second group of tracks in the storage. After the transferring the management of the tracks, the second node manages access to the first and second groups of tracks and caches accessed tracks from the first and second groups in the second cache of the second node. The second cache of the second node is populated with the tracks in a first cache of the first node.

DETAILED DESCRIPTION

In prior art storage controller systems having multiple nodes, when one node is taken offline and the volumes assigned to the surviving node, the surviving node cache does not include the content of the cache being taken offline, so the cache hit ratio and cache performance at the surviving node does not match the performance when both nodes were operational. Described embodiments address this problem by providing techniques to populate the cache at the surviving node with the content of the cache at the node being taken offline so that the cache hit ratio and cache performance at the surviving node approximates the performance experienced when both nodes were caching data.

Figure 1:
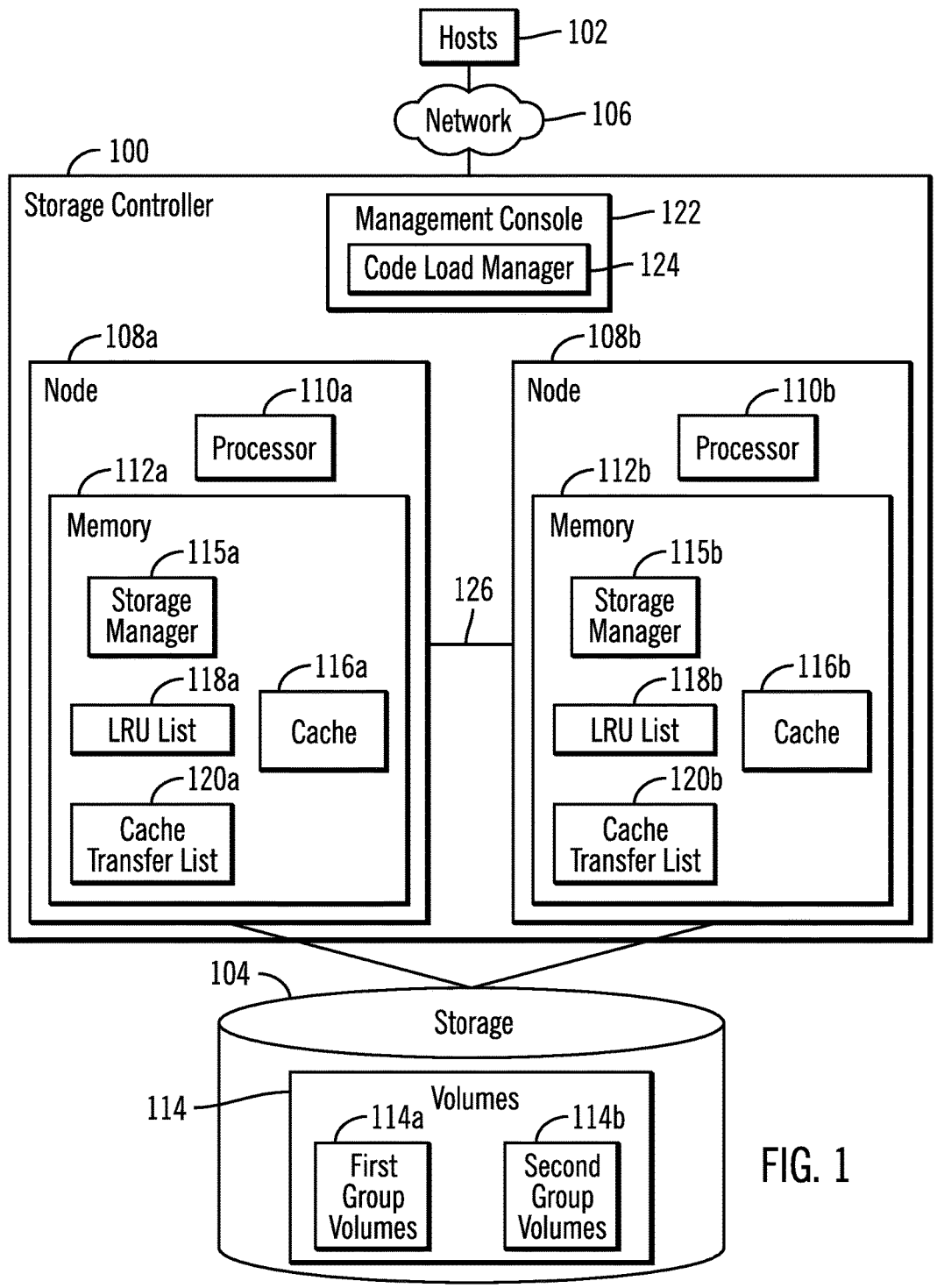
FIG. 1 illustrates an embodiment of a storage environment.

FIG. 1 illustrates a storage environment having a storage controller 100 that provides host 102 systems access to a storage 104 over a network 106. The storage controller 100 includes redundant storage nodes 108a, 108b, where each storage node 108a, 108b includes a processor 110a, 110b, comprising one or more processor devices, and a memory 112a, 112b. Each memory 112a, 112b includes a storage manager 115a, 115b to manage read and write access for that storage node 108a, 108b to volumes 114 in the storage 104 assigned to the particular storage node 108a, 108b. A volume 114 may comprise a Logical Unit Number (LUN), Logical Subsystem (LSS), or any grouping of tracks, where a track may comprise a block, track or any data unit. During operations while the storage nodes 108a, 108b are both operational, each storage node 108a, 108b may be assigned to manage a specific groups of volumes 114a, 114b, respectively.

The memories 112a, 112b further include a cache 116a, 116b, respectively, to cache read and write data with respect to the group of volumes 114 assigned to the storage node 108a, 108b having the cache 116a, 116b. The storage manager 115a, 115b maintains a Least Recently Used (LRU) list 118a, 118b providing an ordered index to the tracks in the cache 116a, 116b subject to read and write access, where a track subject to a read or write operation is added to a Most Recently Used (MRU) end of the LRU list 118a, 118b. The storage managers 115a, 115b may build cache transfer lists 120a, 120b indicating tracks in the cache 116a, 116b that need to be populated in the other cache 116b, 116a.

The storage controller 100 may include a management console 122 coupled to the storage nodes 108a, 108b which includes a code load manager 124 to manage a code load update to upload code, such as software and firmware, at the storage nodes 108a, 108b, such as code to update the storage managers 115a, 115b. In further embodiments, the management console 122 may be external to the storage controller 100 and communicate with the storage nodes 108a, 108b over network 106. In still further embodiments, the code load manager 124 may be implemented on the storage nodes 108a, 108b to internally manage the updating of the code.

The storage nodes 108a, 108b may communicate over a communication link 126, such as a cable, bus, etc., to coordinate the transfer of management of volumes and the contents of the cache 116a, 116b in the event one of the storage nodes 108a, 108 is taken offline.

The network 106 may comprise a Storage Area Network (SAN), Wide Area Network (WAN), Local Area Network (LAN), the Internet, and Intranet, a wireless network, wired network, etc.

The storage 104 may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAIVI), spin transfer torque memory (STM-RAM), conductive bridging RAM (CBRAM), magnetic hard disk drive, optical disk, tape, etc. The volumes 114 may further be configured from an array of devices, such as Just a Bunch of Disks (JBOD), Direct Access Storage Device (DASD), Redundant Array of Independent Disks (RAID) array, virtualization device, etc. Further, the storage 104 may comprise heterogeneous storage devices from different vendors and different types of storage devices, such as a first type of storage devices, e.g., hard disk drives, that have a slower data transfer rate than a second type of storage devices, e.g., SSDs.

In certain embodiments, one or more volumes 114 may be implemented in different types of storage devices. For instance, some of the tracks of one or more volumes 114 may be configured in hard disk drives, while other of the tracks of one or more volumes 114 may be configured in SSDs. Thus, a first type of storage device in which volumes 114 are configured may have a slower data access and transfer rate than a second type of storage device in which volumes are configured.

Figure 2:
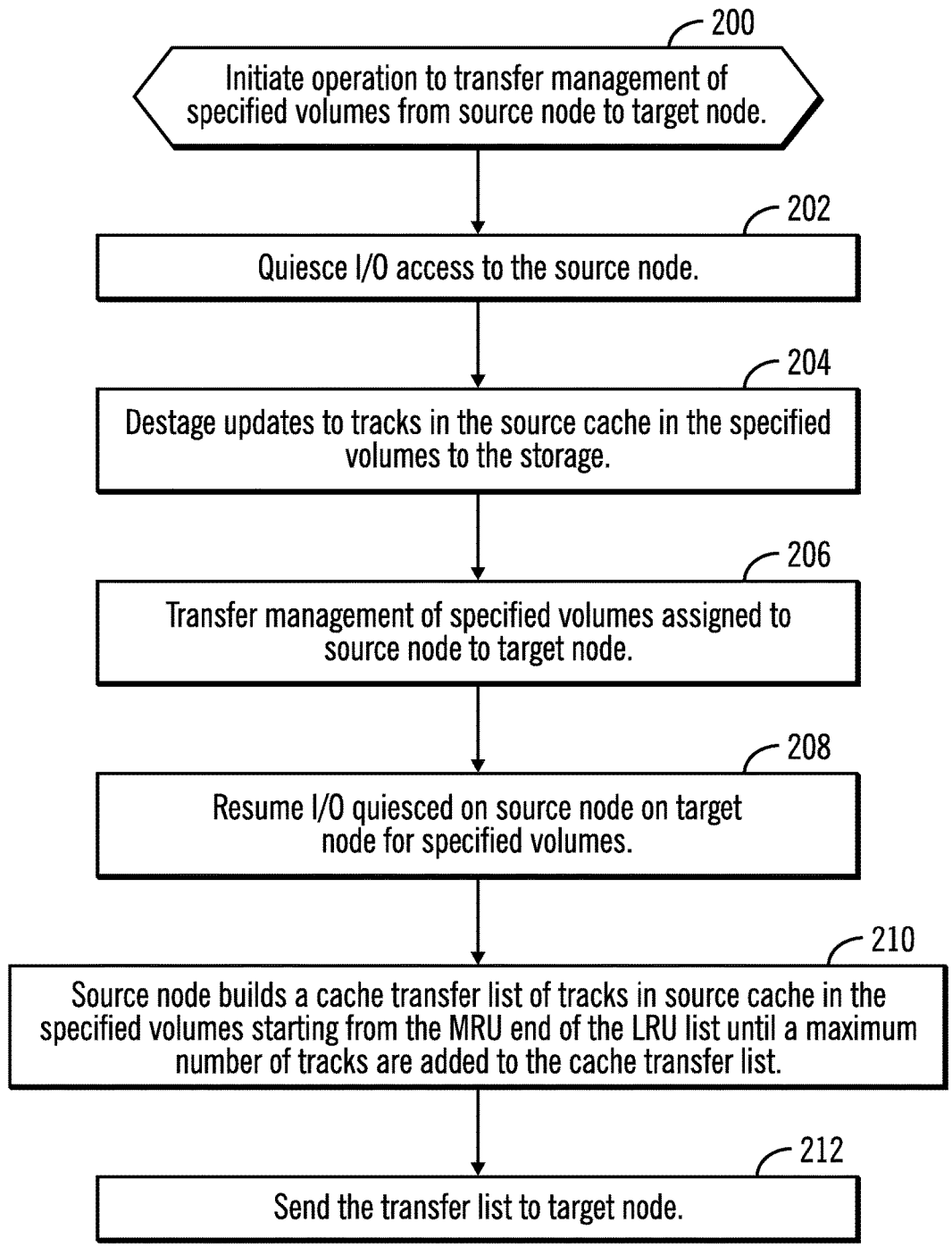
FIG. 2 illustrates an embodiment of operations to transfer management of tracks in specified volumes from a source node to a target node.
Figure 3:
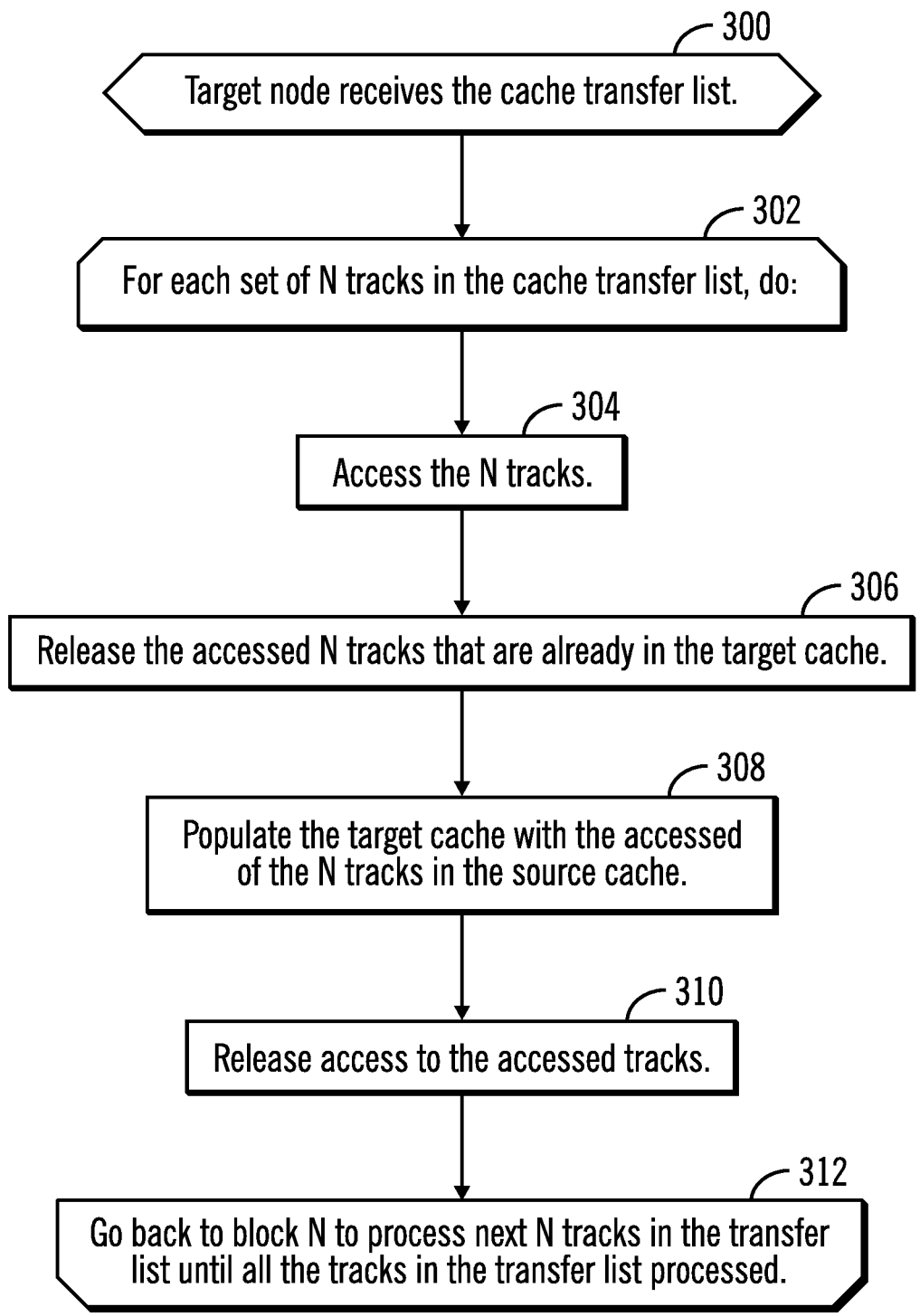
FIGS. 3, 4a, and 4b illustrate embodiments of operations to populate a target cache with tracks in a source cache when transferring management of specified volumes from a source node to a target node.

FIGS. 2 and 3 illustrate an embodiment of operations to transfer ownership of specified volumes, e.g., groups of volumes 114a and/or 114b, and tracks in the cache from a source node (e.g., node 108a or 108b) to a target node (e.g., node 108b or 108a). The source node is the source of the transfer and the target node is the target of the transfer of the management of specified volumes, and either nodes 108a, 108b may be the source or the target. The operations of FIGS. 2 and 3 may be performed by the node storage managers 115a, 115b and/or the code load manager 124 or other component, such as a failback and failover manager. With respect to FIG. 2, upon initiating (at block 200) the operation to transfer ownership of the specified volumes, such as groups of volumes 114a and/or 114b, I/O access at the source node may be quiesced (at block 202). The source node may then destage (at block 204) updates to tracks in the specified volumes in the source cache, e.g., 116a, 116b, to the volumes 114 in the storage 104. The source storage manager, e.g., 115a or 115b, may then transfer (at block 206) management, such as ownership, of the specified volumes assigned to the source node to the target node, so that the target node will handle I/O access to the transferred group of volumes 114 previously assigned to the source node.

I/O quiesced on the source node may then be resumed (at block 208) on the target node for the specified volumes. At this point, the source node may be taken off line for code load update, repairs, upgrades, etc.

The source storage manager may build (at block 210) a source cache transfer list, e.g., 120a or 120b, of tracks in the source cache starting from the MRU end of the LRU list 118a until a maximum number of tracks are added to the source cache transfer list. The source cache transfer list is then sent (at block 212) to the target node.

FIG. 3 illustrates an embodiment of operations performed by the target storage manager, e.g., 115a or 115b, at the target node to populate the target cache with the content of the source cache at the time when management of the specified volumes was transferred. Upon the target node receiving (at block 300) the source cache transfer list from the source node, the target storage manager performs a loop of operations 302-312 for each sequence of N tracks in the source cache transfer list to process the indicated tracks in groups of N. The N tracks being considered are accessed (at block 304) to prevent access by another process. Access is released (at block 306) for any of the accessed tracks that are already in the target cache 116b. The target storage manager or other component then populates the target cache with the accessed N tracks in the source cache. The target cache may be populated with the accessed of the N tracks by transferring the accessed of the N tracks from the source cache directly to the target cache, such as through a Direct Memory Access (DMA) operation, or the tracks may be read from the storage 104 and cached in the target cache. After target cache is populated with the N of the tracks from the source cache, access to the tracks is released (at block 310). Control proceeds (at block 312) back to block 302 to consider a next N (or remaining) tracks in the source cache until all the tracks in the source cache transfer list are processed.

In the operations of FIGS. 2 and 3, the transfer of management of the specified volumes and the population of tracks in the target cache are performed with respect to specified volumes. In alternative embodiments, groupings of tracks and data units other than volumes may be specified for the transfer of tracks and population of the target cache.

With the operations of FIGS. 2 and 3, the target cache of the target node is populated with the tracks in the source cache from which volume management is transferred to maintain the cache hit ratio of cache access during the time the source node is not servicing host I/O requests, because the target cache is populated with the tracks in the source cache to maintain the cache hit ratio at the target node to which management of the volumes is transferred.

Figure 4A:
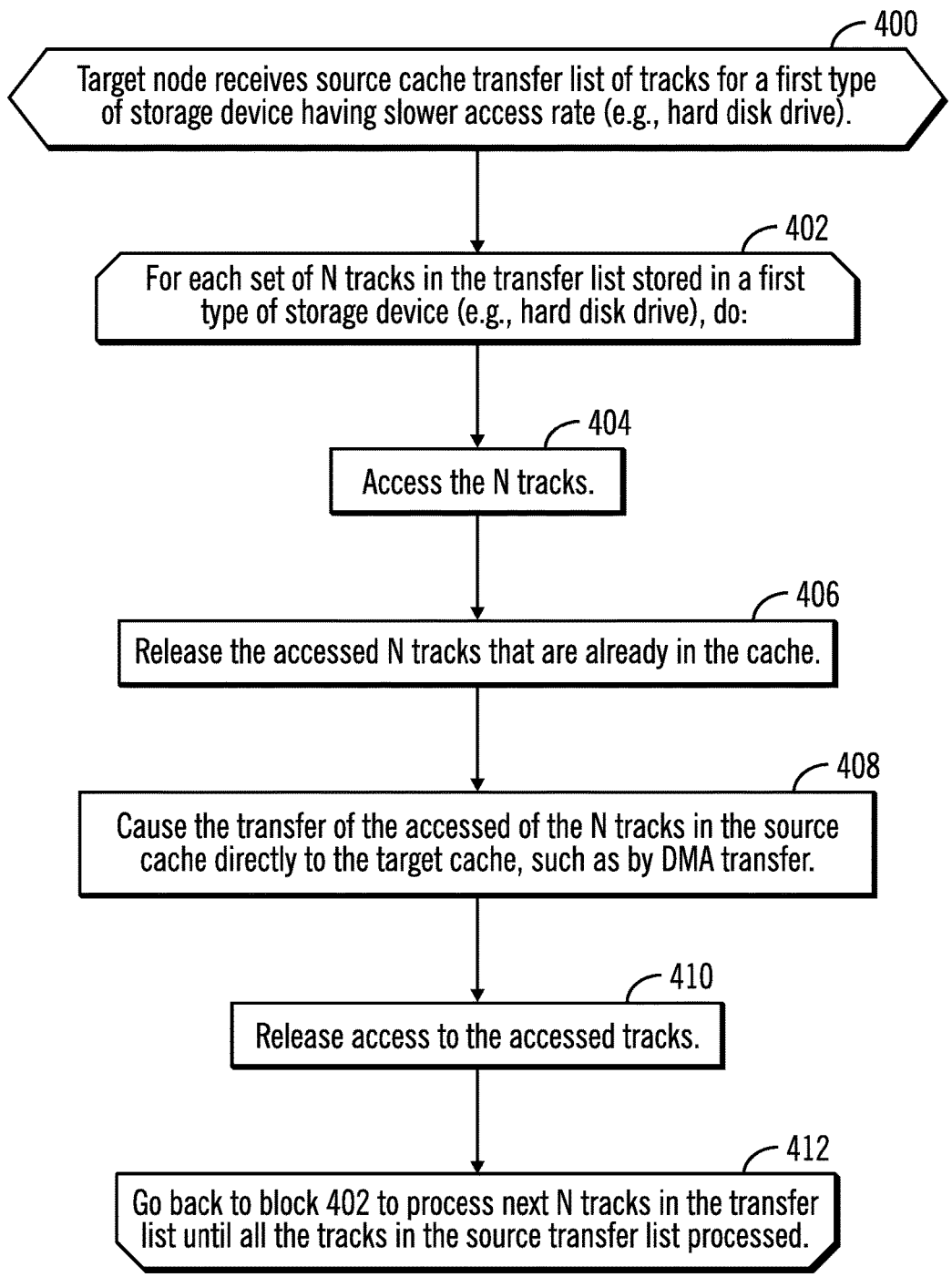
Figure 4B:
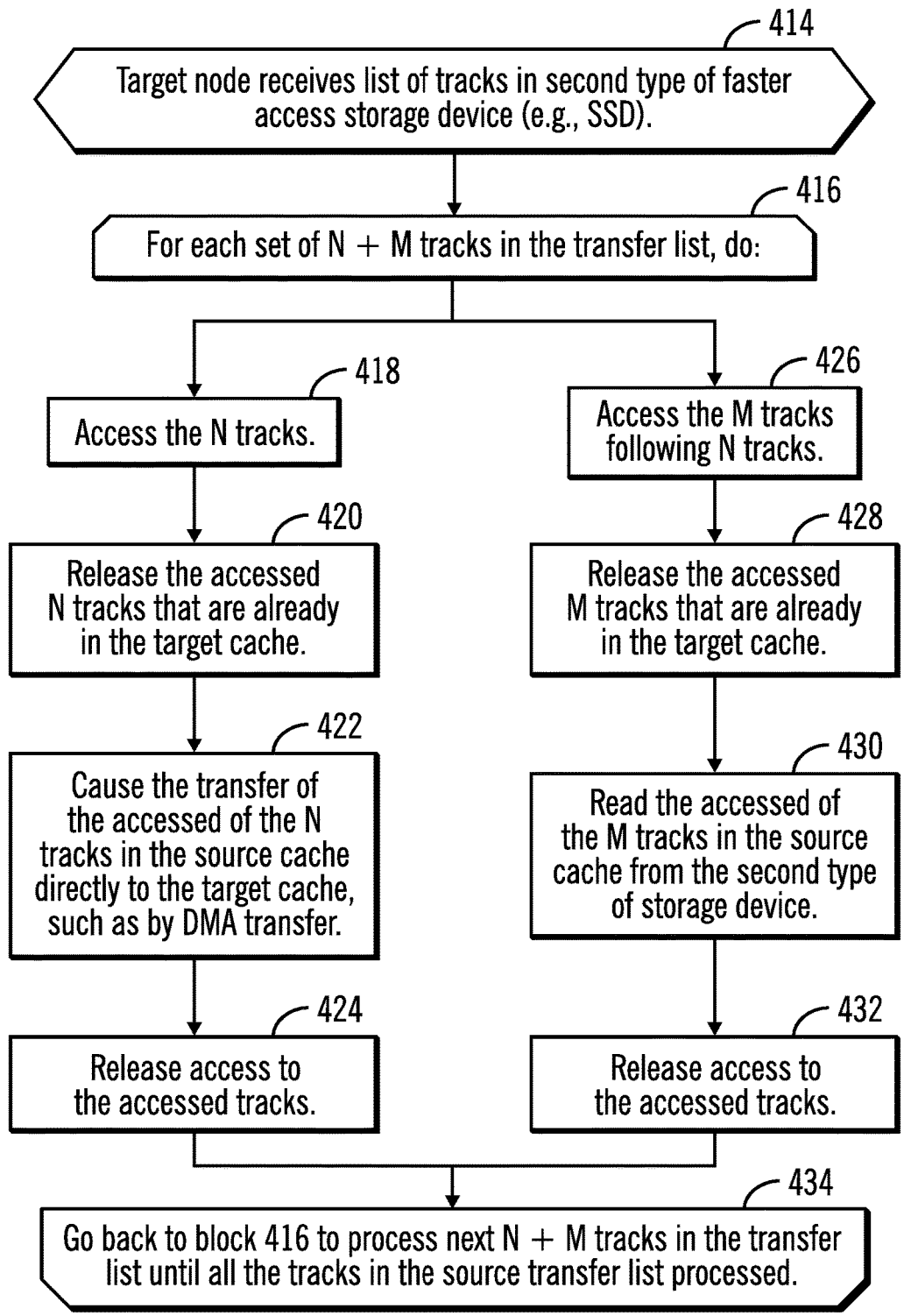

FIGS. 4a and 4b illustrate an alternative embodiment of operations to populate the target cache, e.g., 116a or 116b, with tracks for specified volumes, e.g., groups of volumes 114a and/or 114b, in the source cache, e.g., 116a or 116b, that takes into account the transfer rate speed of the type of storage device in which the tracks are stored. In the operations of FIG. 4a, the source node would have generated a source cache transfer list 120a having tracks in the source LRU list 118a or 118b that are in a first type of storage device, e.g., a relatively slower transfer rate storage such as a hard disk drive. Upon the target node, e.g., 108a or 108b, receiving (at block 400) the source cache transfer list, e.g., 120a, 120b, of tracks for a first type of storage device having relatively slower data transfer rate (e.g., hard disk drive), the target storage manager performs a loop of operations at blocks 402 through 412 for each sequence of N tracks in the source cache transfer list to process the indicated tracks in groups of N. The N tracks being considered are accessed (at block 404) to prevent access by another process. Access is released (at block 406) for any of the accessed tracks that are already in the target cache 116b. The target storage manager or other component causes the transfer of the accessed N tracks in the source cache directly to the target cache from the source cache over the link 126, such as by using a DMA operation from the source cache to the target cache. After the tracks are transferred, access to the tracks is released (at block 410). Control proceeds (at block 412) to block 402 to consider a next N (or remaining) tracks in the source cache transfer list until all the tracks in the source cache transfer list are processed.

In the operations of FIG. 4b, the source node would have generated a source cache transfer list, e.g., 120a, 120b, having tracks in the source LRU list 118a or 118b that are in a second type of storage device, such as having a faster transfer rate, such as a SSD, which is faster than the first type of storage device. Upon the target node, e.g., 108a or 108b, receiving (at block 414) the source cache transfer list, e.g., 120a, 120b of tracks for a second type of storage device having a faster data transfer rate (e.g., SSD), the target storage manager performs a loop of operations at blocks 416 through 434 for each sequence of N+M tracks in the source cache transfer list to process the indicated tracks in groups of N+M tracks in the faster second type of storage device.

The target storage manager then performs two streams of parallel operations, a first stream at blocks 418 through 424 for the first N tracks and a second stream at block 426 through 432 for the second M tracks in the group of N+M tracks.

For the first stream, the target storage manager accesses (at block 418) the N tracks to prevent access by another process. Access is released (at block 420) for any of the accessed N tracks that are already in the target cache already. The target storage manager or other component causes (at block 422) the transfer of the accessed N tracks in the source cache directly to the target cache from the source cache, such as by using a DMA operation from the source cache to the target cache. After the tracks are transferred, access to the tracks is released (at block 424).

For the second stream and in parallel to the operations performed for the first stream, the target storage manager accesses (at block 426) the M tracks following the N tracks in the source cache transfer list in the group of N+M tracks to prevent access by another process. Access is released (at block 428) for any of the accessed M tracks that are already in the target cache already. The target storage manager or other component reads (at block 430) the accessed of the M tracks that are in the source cache from the second type of storage device, such as an SSD. After the tracks are transferred, access to the tracks is released (at block 432).

After performing both parallel streams of transferring the N and M tracks, control proceeds (at block 434) to block 416 to consider a next N+M (or remaining) tracks in the source cache transfer list until all the tracks in the source cache transfer list are processed.

In the operations of FIG. 4b, N and M may be set such that both separate streams of cache transfer operations, through DMA from the source cache or reading from storage, would complete at approximately the same time. For instance, if the DMA operations are faster than the reading from the fast access storage device, e.g., SSD, then N may be set to a greater number than M so that both the first and second streams of transfer operations complete at approximately the same time. The opposite is true, i.e., M is greater than N, if the storage device read operations have a faster transfer time than the cache DMA operation.

With the operations of FIG. 4b, if the tracks are stored in a faster access storage device, then the tracks in the source cache may be transferred from two different locations, a direct DMA transfer from the source cache and from the faster access storage devices to reduce the time needed to populate the target cache with the tracks from the source cache by transferring tracks in parallel from two different data sources. When the storage devices in which the tracks are stored are not sufficiently fast to approximate the speed of the DMA transfer, then as in FIG. 4a, all the tracks may be transferred directly from the source cache.

In a still further embodiment, the tracks can be transferred in parallel directly from the source cache for tracks stored in the slower first type of storage device and at the same time tracks in the second type of storage device can be read from the faster storage device.

In implementations where the storage 104 is only comprised of the first type of storage devices, then only the operations at blocks 402-412 in FIG. 4a would be performed to populate the target cache with the tracks in the source. In implementation where the storage 104 is only comprised of the second type of storage devices, then only the operations at blocks 416-434 would be performed to populate the target cache with the tracks in the source cache.

Figure 5:
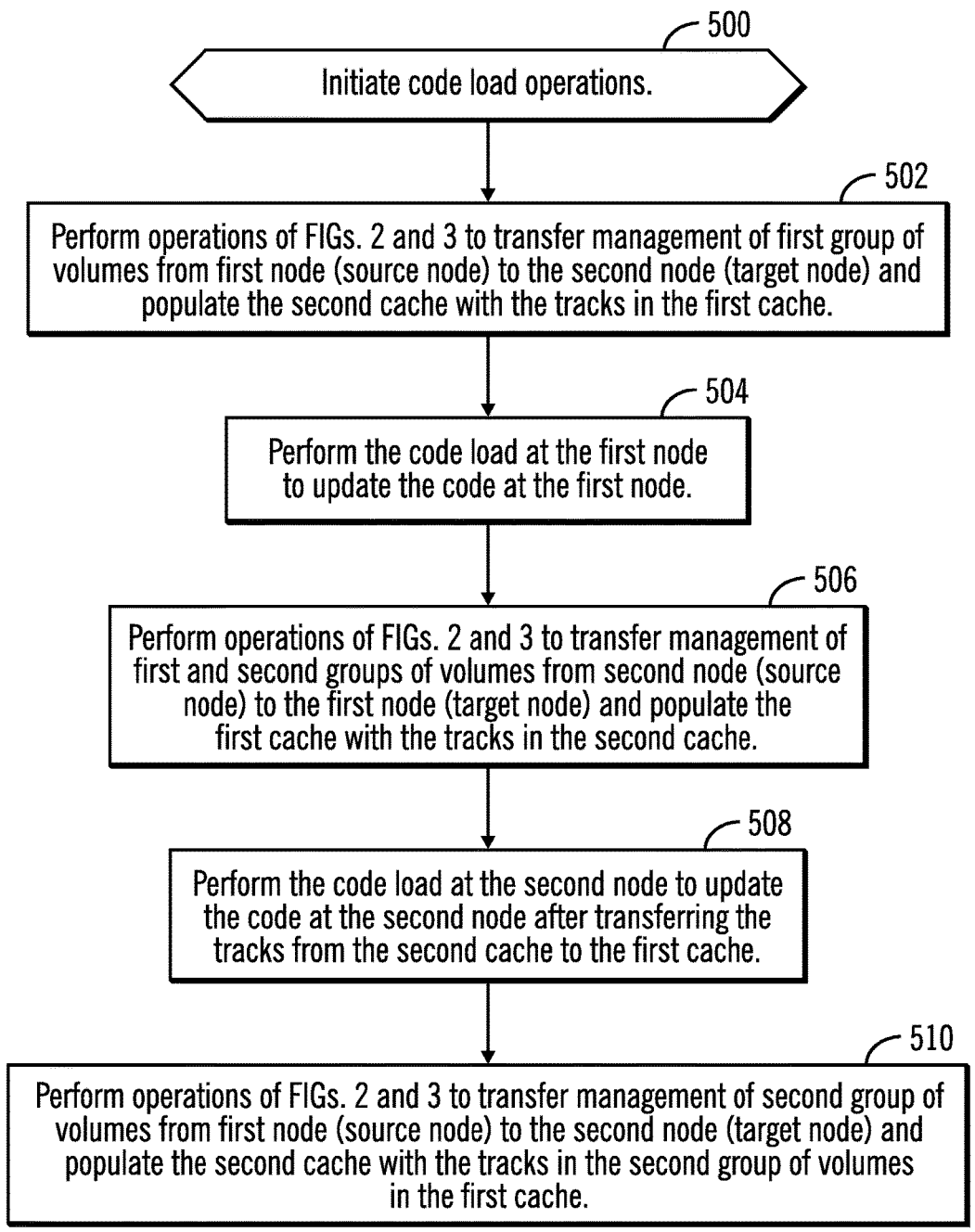
FIG. 5 illustrates an embodiment of operations to perform a code load update at first and second nodes.

FIG. 5 illustrates an embodiment of operations to use the volume management transfer and cache transfer operations of FIGS. 2, 3, 4a, and 4b in the context of performing a code load operation at the first 108a and second 108b nodes of a storage controller 100 to allow one of the nodes 108a or 108b to remain online servicing I/O requests directed to the volumes 114 while the other of the nodes 108b or 108a is having a code load update. Upon initiating (at block 500) code load operations, the code load manager 124 may initiate the operations of FIGS. 2 and 3 (or alternately FIGS. 4a and 4b) to transfer management of first group of volumes 114a (operating as the specified volumes) from the first node 108a (operating as the source node) to the second node 108b (operating as the target node) and populate the second cache 116bf with all the tracks in first cache 116a. After performing the transfer, the code load at the first node 108a is performed (at block 504) to update the code at the first node 108a. While the first node 108a is being updated, the second node 108a may handle I/O operations from the hosts 102 to the volumes 114 uninterrupted.

After completing the code load at the first node 108a, the operations of FIGS. 2 and 3 (or alternately FIGS. 4a and 4b) are performed (at block 506) to transfer management of the first 114a and second 114b groups of volumes (operating as the specified volumes) from the second node 108b (operating as the source node) to the first node 108a (operating as the target node) and populate the first cache 116a with all tracks in the second cache 116b. After transferring the management of the volumes to the first node 108a, the code load at the second node 108b is performed (at block 508) to update the code at the second node 108b. While the second node 108b is being updated during the code load, the first node 108a may continue servicing I/O operations from the hosts 102 to the volumes 114 uninterrupted.

After updating the code at both the first 108a and the second 108b nodes, the operations of FIGS. 2 and 3 (or alternately FIGS. 4a and 4b) are performed (at block 510) to transfer management of the second group 114b (operating as the specified volumes) from the first node 108a (operating as the source node) back to the second node 108b (operating as the target node) and populate the second cache 116b with the tracks in the second group of volumes 114b in the first cache 116a.

After the operations of block 510, both nodes 108a, 108b manage/own the groups of volumes 114a, 114b originally assigned to the nodes to return the controller 100 to the assignment of volumes to nodes that existed before the code load updates at the nodes 108a, 108b.

Further, with the embodiments of FIG. 5 during the code load, the cache 116a, 116b of the surviving node is populated with the tracks in the cache of the node that will be subject to the code update to maintain the cache hit ratio of cache access during the time one of the nodes 108a, 108b is taken offline to perform a code load update.

Although the operations of FIGS. 2, 3, 4a, and 4b may be performed during a code load update as in the described embodiment of FIG. 5, in alternative embodiments, the volume management transfer and cache transfer operations of FIGS. 2, 3, 4a, and 4b may be performed in other contexts such as a failover and failback from one node to the other if one node fails. After a failed node is serviced and brought back online, the operations at block 510 in FIG. 5 may be performed to return the volumes initially assigned to the failed and reassigned to the surviving node back to the now operational node.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
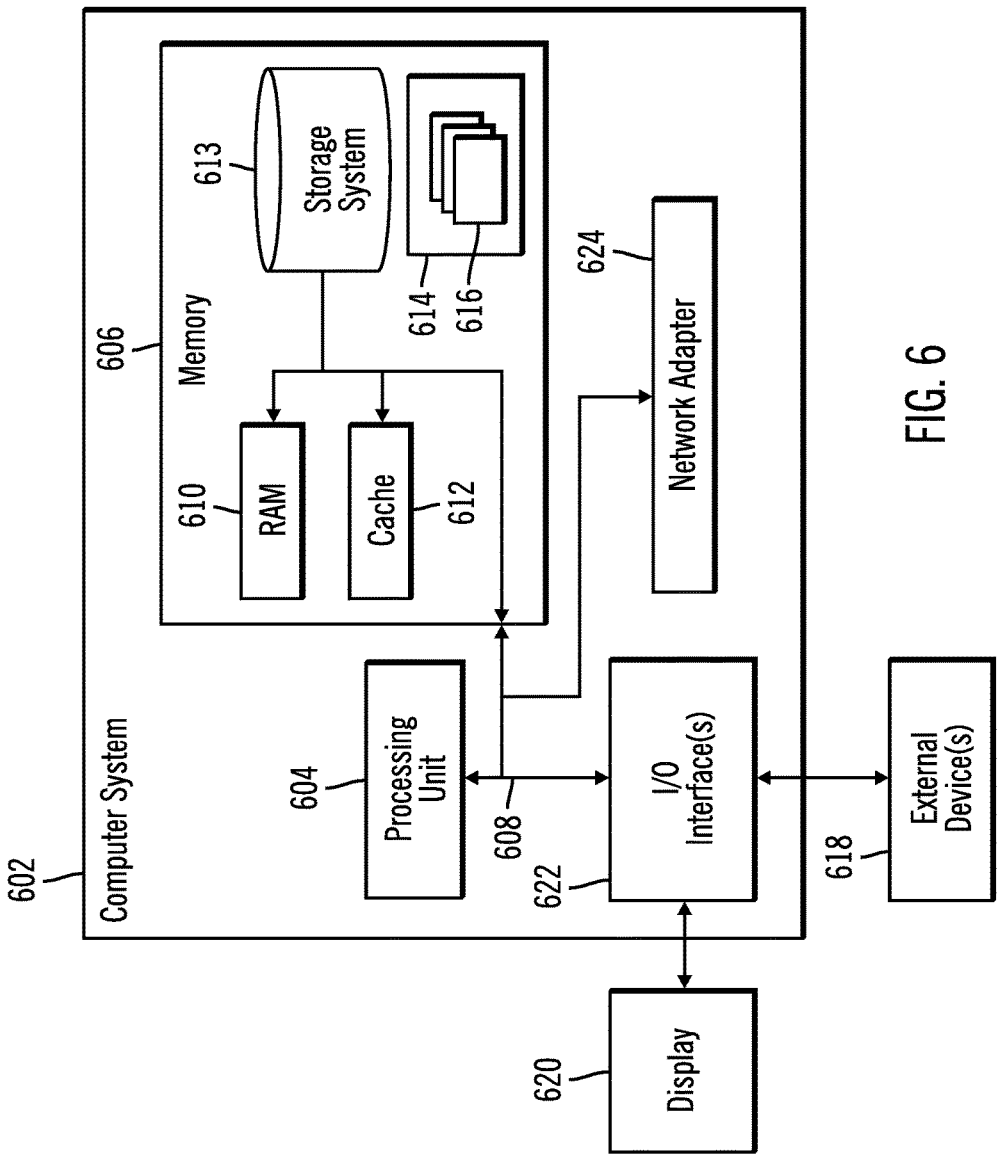
FIG. 6 illustrates an embodiment of a computer architecture used with described embodiments.

The computational components of FIG. 1, including the nodes 108a, 108b, and hosts 102 may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for transferring tracks from a first node having a first cache to a second node having a second cache, the computer program product comprising a computer readable storage medium having computer readable program code embodied therein that is executable to perform operations, the operations comprising:
    providing a cache transfer list of tracks in the first cache to transfer to the second cache to manage by the second node;
    transferring a first number of tracks indicated in the cache transfer list maintained in the first cache from the first cache to the second cache; and
    transferring a second number of tracks indicated in the cache transfer list maintained in the first cache and stored in a storage from the storage to the second cache.

2. The computer program product of claim 1, wherein the operations further comprise:
    managing, by the second node, access to the tracks in the cache transfer list after transferring the tracks from the first cache to the second cache.

3. The computer program product of claim 1, wherein the transferring of the first number of tracks from the first cache and the transferring of the second number of tracks from the storage are performed in parallel.

4. The computer program product of claim 1, wherein the storage comprises a first type of storage, wherein the first number of tracks transferred from the first cache are stored in a second type of storage, wherein the first type of storage has a faster access than the second type of storage.

5. The computer program product of claim 1, wherein the second number of tracks follows the first number of tracks in the cache transfer list.

6. The computer program product of claim 1, wherein multiple iterations of transferring the first number of tracks and transferring the second number of tracks are performed until all tracks indicated in the cache transfer list are transferred to the second cache.

7. The computer program product of claim 1, wherein the transferring of the first number of tracks comprises accessing tracks of the first number of tracks that are not currently stored in the second cache and releasing the accessed tracks of the first number of tracks in response to transferring the first number of tracks to the second cache, and wherein the transferring of the second number of tracks comprises accessing tracks of the second number of tracks that are not currently stored in the second cache and releasing the accessed tracks of the second number of tracks in response to transferring the second number of tracks to the second cache.

8. A system for transferring tracks from a first node having a first cache comprising:
    a processor;
    a second cache;
    a computer readable storage medium having computer readable program code embodied therein that is executable to perform operations, the operations comprising:
        receiving a cache transfer list of tracks in the first cache to transfer to the second cache to manage by the system;
        transferring a first number of tracks indicated in the cache transfer list maintained in the first cache from the first cache directly to the second cache; and
        transferring a second number of tracks indicated in the cache transfer list maintained in the first cache and stored in a storage from the storage to the second cache.

9. The system of claim 8, wherein the operations further comprise:
    managing access to the tracks in the cache transfer list after transferring the tracks from the first cache to the second cache.

10. The system of claim 8, wherein the transferring of the first number of tracks from the first cache and the transferring of the second number of tracks from the storage are performed in parallel.

11. The system of claim 8, wherein the storage comprises a first type of storage, wherein the first number of tracks transferred from the first cache are stored in a second type of storage, wherein the first type of storage has a faster access than the second type of storage.

12. The system of claim 8, wherein the second number of tracks follows the first number of tracks in the cache transfer list.

13. The system of claim 8, wherein multiple iterations of transferring the first number of tracks and transferring the second number of tracks are performed until all tracks indicated in the cache transfer list are transferred to the second cache.

14. The system of claim 8, wherein the transferring of the first number of tracks comprises accessing tracks of the first number of tracks that are not currently stored in the second cache and releasing the accessed tracks of the first number of tracks in response to transferring the first number of tracks to the second cache, and wherein the transferring of the second number of tracks comprises accessing tracks of the second number of tracks that are not currently stored in the second cache and releasing the accessed tracks of the second number of tracks in response to transferring the second number of tracks to the second cache.

15. A method for transferring tracks from a first node having a first cache to a second node having a second cache, comprising:
    providing a cache transfer list of tracks in the first cache to transfer to the second cache to manage by the second node;
    transferring a first number of tracks indicated in the cache transfer list maintained in the first cache from the first cache to the second cache; and
    transferring a second number of tracks indicated in the cache transfer list maintained in the first cache and stored in a storage from the storage to the second cache.

16. The method of claim 15, further comprising:
    managing, by the second node, access to the tracks in the cache transfer list after transferring the tracks from the first cache to the second cache.

17. The method of claim 15, wherein the transferring of the first number of tracks from the first cache and the transferring of the second number of tracks from the storage are performed in parallel.

18. The method of claim 15, wherein the storage comprises a first type of storage, wherein the first number of tracks transferred from the first cache are stored in a second type of storage, wherein the first type of storage has a faster access than the second type of storage.

19. The method of claim 15, wherein the second number of tracks follows the first number of tracks in the cache transfer list.

20. The method of claim 15, wherein multiple iterations of transferring the first number of tracks and transferring the second number of tracks are performed until all tracks indicated in the cache transfer list are transferred to the second cache.

21. The method of claim 15, wherein the transferring of the first number of tracks comprises accessing tracks of the first number of tracks that are not currently stored in the second cache and releasing the accessed tracks of the first number of tracks in response to transferring the first number of tracks to the second cache, and wherein the transferring of the second number of tracks comprises accessing tracks of the second number of tracks that are not currently stored in the second cache and releasing the accessed tracks of the second number of tracks in response to transferring the second number of tracks to the second cache.

* * * * *